US012786833B2

(12) United States Patent
Hashmi et al.

(10) Patent No.: US 12,786,833 B2
(45) Date of Patent: Nov. 3, 2026

(54) FACILITATING ARTIFICIAL INTELLIGENCE ENABLED DYNAMIC THRESHOLD-BASED CELL AND/OR CARRIER SWITCHING FOR ENERGY EFFICIENCY IN ADVANCED COMMUNICATION NETWORKS

(71) Applicant: Dell Products, L.P., Round Rock, TX (US)

(72) Inventors: Umair Sajid Hashmi, Mississauga (CA); Jeebak Mitra, Ottawa (CA); Gwenael Poitau, Montreal (CA)

(73) Assignee: DELL PRODUCTS L.P., Round Rock, TX (US)

( * ) Notice: Subject to any disclaimer, the term of this patent is extended or adjusted under 35 U.S.C. 154(b) by 296 days.

(21) Appl. No.: 18/620,563

(22) Filed: Mar. 28, 2024

(65) Prior Publication Data

US 2025/0310849 A1 Oct. 2, 2025

(51) Int. Cl.
*H04W 36/22* (2009.01)
*H04W 52/02* (2009.01)

(52) U.S. Cl.
CPC ....... *H04W 36/22* (2013.01); *H04W 52/0206* (2013.01)

(58) Field of Classification Search
CPC . H04W 24/02; H04W 28/0942; H04W 72/52; H04W 28/08
See application file for complete search history.

(56) References Cited

U.S. PATENT DOCUMENTS 10,841,853 B1 * 11/2020 Yousefi'zadeh ..... G06N 3/0499
2012/0244869 A1 * 9/2012 Song .................... H04W 52/02 455/449

(Continued)

FOREIGN PATENT DOCUMENTS

EP 2919531 A1 * 9/2015 ........ H04W 52/0206
WO WO-2024028182 A1 * 2/2024 ............ G06N 3/092

OTHER PUBLICATIONS

Imran et al., "Challenges in 5G: How to Empower SON with Big Data for Enabling 5G", IEEE Network, Nov./Dec. 2014, pp. 2-9.

(Continued)

*Primary Examiner* — Rafael Pérez-Gutiérrez
(74) *Attorney, Agent, or Firm* — Amin, Turocy & Watson, LLP

(57) ABSTRACT

Facilitating artificial intelligence enabled dynamic threshold-based cell and/or carrier switching for energy efficiency in advanced communication networks is provided. A method includes determining traffic load switching thresholds for respective cells of a group of cells of a communications network. The method also includes determining respective results of application of a utility function to the respective cells. Based on the traffic load switching thresholds and the respective results of the utility function, the method includes determining that a selected switching policy for a single cell of the group of cells satisfies a parameter of the utility function. In addition, the method includes facilitating implementing the selected switching policy for the single cell. Respective switching policies of other cells of the group of cells, other than the single cell, are not implemented during the implementing of the selected switching policy for the single cell.

20 Claims, 10 Drawing Sheets

(56) References Cited

U.S. PATENT DOCUMENTS

| | | | | |
|---|---|---|---|---|
| 2023/0362809 | A1* | 11/2023 | Dixit | H04W 52/0206 |
| 2024/0422650 | A1* | 12/2024 | Hashmi | H04W 24/02 |
| 2024/0430793 | A1* | 12/2024 | Hashmi | H04W 24/02 |
| 2025/0184819 | A1* | 6/2025 | Hashmi | H04W 36/22 |

OTHER PUBLICATIONS

Cili et al., "Cell Switch off Technique Combined with Coordinated Multi-Point (COMP) Transmission for Energy Efficiency in Beyond-LTE Cellular Networks", IEEE ICC'12 Workshop on Green Communications and Networking, 2012, pp. 5931-5935.

"System Architecture for the 5G System (5GS)", 3GPP TS 23.501 version 15.7.0 Release 15, Technical Specification, Oct. 2019, 250 pages.

* cited by examiner

212

$$\alpha(\%EE)\beta(\%QoS);$$

300

$$\max\left(\sum_{k=0}^{N}\frac{R_k}{NP_o}\right)^{\alpha}\left(\sum_{n=1}^{C}\sum_{m=1}^{|G_n|}\frac{W_n QoS_{n,m}}{|UE|}\right)^{\beta}$$

FIG. 3

400

$$\alpha(\%EE)\beta(\%QoS)$$

FIG. 4

FACILITATING ARTIFICIAL INTELLIGENCE ENABLED DYNAMIC THRESHOLD-BASED CELL AND/OR CARRIER SWITCHING FOR ENERGY EFFICIENCY IN ADVANCED COMMUNICATION NETWORKS

BACKGROUND

The use of computing devices is ubiquitous. Given the explosive demand placed upon mobility networks and the advent of advanced use cases (e.g., streaming, gaming, and so on), power consumption in such networks is higher as compared to Long Term Evolution (LTE) networks, for example. Such power consumption can be attributed to the exponential increase in the network traffic flowing through the advanced network and the need for faster processing of complex tasks. Accordingly, unique challenges exist related to network efficiency and in view of forthcoming Fifth Generation (5G), new radio (NR), Sixth Generation (6G), or other next generation, standards for network communication.

The above-described context with respect to communication networks is merely intended to provide an overview of current technology and is not intended to be exhaustive. Other contextual descriptions, and corresponding benefits of some of the various non-limiting embodiments described herein, will become further apparent upon review of the following detailed description.

SUMMARY

The following presents a simplified summary of the disclosed subject matter to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An embodiment relates to a method that includes determining, by a system comprising at least one processor, traffic load switching thresholds for respective cells of a group of cells of a communications network. The method also includes determining, by the system, respective results of application of a utility function to the respective cells. Based on the traffic load switching thresholds and the respective results of the utility function, the method includes determining, by the system, that a selected switching policy for a single cell of the group of cells satisfies a parameter of the utility function. In addition, the method includes facilitating, by the system, implementing the selected switching policy for the single cell. Respective switching policies of other cells of the group of cells, other than the single cell, are not implemented during the implementing of the selected switching policy for the single cell.

According to some implementations, the method can include, prior to the determining the respective results of application of the utility function, determining, by the system, candidate cells of the group of cells for implementation of the respective switching f policies. The candidate cells include the single cell and the other cells of the group of cells. The method can also include, prior to the facilitating the implementing of the selected switching policy for the single cell, selecting, by the system, the single cell based on a result of the respective results associated with the single cell being determined to maximize the utility function as compared to respective other results of the respective results determined for the other cells. In some implementations, determining of the respective results of the application of the utility function can include determining a first percentage of energy efficiency savings of the group of cells as compared to a peak power consumption. Further, determining of the respective results of the application of the utility function can include determining a second percentage of user equipment quality of service achieved compared to a group of satisfied scenarios as a result of the selected switching policy for the single cell and the respective switching policies of the other cells of the group of cells. In an example, the selected switching policy for the single cell is a policy that switches off the single cell. Further to this example, the method can include, prior to the facilitating the implementing of the selected switching policy for the single cell, implementing a handover of user equipment from the single cell being switched off to a nearby cell selected from the group of cells. The nearby cell can be selected based on a determination that, prior to the single cell being switched off, a received power level at the user equipment, provided by the nearby cell, satisfies a defined received power level. In accordance with some implementations, facilitating the implementing of the selected switching policy for the single cell can include performing one of the following. Based on a first determination that a current traffic load of the single cell fails to satisfy a determined traffic load switching threshold for the single cell and the single cell is in an active state, facilitating changing a state of the single cell from the active state to an inactive state. Based on a second determination that the current traffic load of the single cell fails to satisfy a determined traffic load switching threshold for the single cell and the single cell is in the inactive state, facilitating maintaining the single cell in the inactive state. Based on a third determination that the current traffic load of the single cell satisfies the determined traffic load switching threshold for the single cell and the single cell is in the inactive state, facilitating changing the state of the single cell from the inactive state to the active state. Based on a fourth determination that the current traffic load of the single cell satisfies the determined traffic load switching threshold for the single cell and the single cell is in the active state, facilitating maintaining the single cell in the active state.

The utility function is based on an optimization function that facilitates a tradeoff between user equipment quality of service and cluster wide energy efficiency for the group of cells. Further, the user equipment quality of service is defined for respective user equipment classes of user equipment within the communications network.

According to some implementations, determining of the traffic load switching thresholds is based on a first reinforcement learning model and the facilitating of the implementing of the selected switching policy for the single cell is based on a second reinforcement learning model. Further to these implementations, the method can include, after the facilitating of the implementing of the selected switching policy for the single cell, receiving, by the system, first information indicative of state metrics and second information indicative of performance indicators. In addition, the method can include determining, by the system, a first reward value to apply to the first reinforcement learning model and a second reward value to apply to the second reinforcement learning model.

The communications network can be deployed as a disaggregated architecture that comprises central units, distributed units, and a near-real-time-radio access network intelligent controller, according to some implementations. Further, in some implementations, the group of cells is configured to operate according to a new radio network communication protocol.

Another embodiment relates to a system that includes a processor and a memory that stores executable instructions that, when executed by the processor, facilitate performance of operations. The operations can include, based on respective traffic load switching thresholds and respective results of a utility function determined for respective cells of a group of cells of a communication network, selecting a cell from the group of cells. The selecting can include determining that a result of the utility function for the cell satisfies a parameter of the utility function. In addition, the operations can include causing a switching policy defined for the cell to be implemented while other switching policies defined for the other cells of the group of cells are not implemented. The group of cells can be configured to operate according to a fifth generation network communication protocol.

According to some implementations, the operations can include determining the respective results of the utility function which can include determining a first percentage of energy efficiency savings of the group of cells as compared to a peak power consumption. In addition, determining the respective results of the utility function can include determining a second percentage of user equipment quality of service achieved compared to a group of satisfied scenarios based on the switching policy defined for the cell and the respective switching policies of the other cells of the group of cells.

The utility function is based on an optimization function that facilitates a tradeoff between user equipment quality of service and cluster wide energy efficiency for the group of cells. In addition, the user equipment quality of service is defined for respective user equipment classes of user equipment within the communication network.

According to some implementations, the system is implemented by a network intelligence controller that comprises a first agent and a second agent. The first agent determines the respective traffic load switching f thresholds, and the second agent determines the respective results of the utility function. Further to these implementations, the first agent determines the respective traffic load switching thresholds based on a first reinforcement learning model trained to a first defined level of confidence. In addition, the second agent determines the respective results of the utility function based on a second reinforcement learning model trained to a second defined level of confidence.

Yet another embodiment relates to a non-transitory machine-readable medium, comprising executable instructions that, when executed by a processor of network equipment, facilitate performance of operations. The operations can include determining traffic load switching thresholds and respective results of a utility function for respective cells of a group of cells of a communications network. The operations can also include, based on the respective traffic load switching thresholds and the respective results of the utility function, determining that a selected switching policy for a single cell of the group of cells satisfies a parameter of the utility function. Further, the operations can include initiating implementation of the selected switching policy for the single cell. Respective switching policies of other cells of the group of cells, other than the single cell, are not implemented during the initiating of the implementing of the selected switching policy for the single cell.

In some implementations, the operations can include, prior to the initiating of the implementing of the selected switching policy for the single cell, determining respective results of the utility function for candidate cells of the group of cells for implementation of the respective switching policies. The candidate cells comprise the single cell and the other cells of the group of cells. Further to these implementations, the operations can include selecting the single cell based on a result of the utility function associated with the single cell being determined to maximize the utility function as compared to the respective results of the utility function determined for the other cells.

In an example, the utility function is based on an optimization function that facilitates a tradeoff between user equipment quality of service and cluster wide energy efficiency for the group of cells. In addition, the user equipment quality of service is defined for respective user equipment classes of user equipment within the communications network.

To the accomplishment of the foregoing and related ends, the disclosed subject matter includes one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description can include additional or alternative embodiments beyond those described in this summary.

BRIEF DESCRIPTION OF THE DRAWINGS

Various non-limiting embodiments are further described with reference to the accompanying drawings in which:

FIG. 3 illustrates a second equation for a cluster wide optimization function in accordance with one or more embodiments described herein;

FIG. 4 illustrates a third equation for the reward assigned to the reinforcement learning applications in accordance with one or more embodiments described herein;

DETAILED DESCRIPTION

Figure 1:
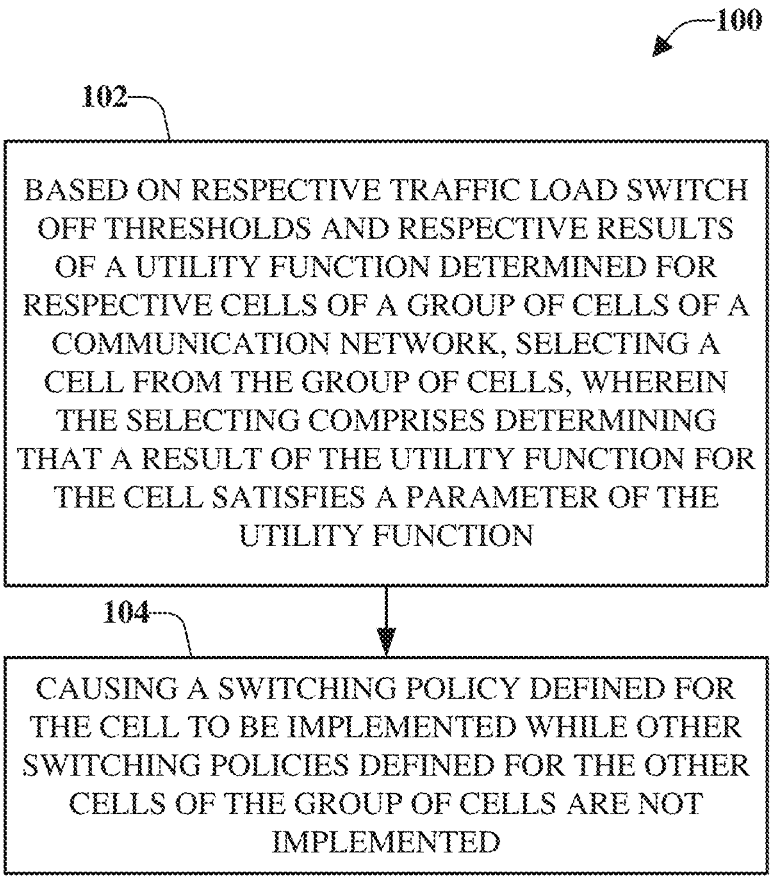
FIG. 1 illustrates a flow diagram of an example, non-limiting, computer-implemented method that facilitates artificial intelligence enabled dynamic threshold-based cell and/or carrier switching for energy efficiency in advanced communication networks in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details. In other instances, well-known structures and devices are shown in block diagram form in order to facilitate describing the various embodiments.

The high energy consumption of mobile networks (e.g., 5G networks, New Radio (NR) networks, and other advanced networks) is a source of concern for various reasons. For example, the high energy consumption can increase the operators' operational expenditure (OPEX). In another example, the high energy consumption can increase carbon emissions, which can be in direct conflict with, and can hamper, strategic climate goals and/or environmentally friendly policies adopted by governments and/or corporations around the globe. Conventional static energy saving techniques are not effective in mobile networks that have fluctuating traffic loads and User Equipment (UE) mobility patterns. Multiple energy saving (ES) features for mobile networks, such as deep sleep mode, carrier shut down, and radio frequency (RF) channels' switch off/on can be available in some form in conventional cellular networks (e.g., 5G networks and other advanced networks). However, due to the large parameter space involved in energy minimization processes in conventional networks, the ensuing optimization problem becomes non-polynomial-hard (NP-hard), which implies significant computation for obtaining an optimal (or the best possible) parameter set.

Reducing energy consumption of mobile networks has become a central theme for the optimization of current and future networks. Network operators and equipment vendors alike are putting in significant efforts to minimize the energy footprint of networks. The introduction of the diverse use cases for 5G and beyond 5G (B5G) networks with commensurate densification of the networks has meant a vastly increased network energy budget for the same coverage area. While several efforts have been made by the standards bodies, such as the Third Generation Partnership Project (3GPP), to consider energy efficiency (EE) as an integral part of the design, much is yet to be done to meaningfully address this issue. Furthermore, with a huge increase in connected devices and their associated features, the number of dimensions to consider for network design that both meets the diversity of user traffic and intelligently uses the network has increased exponentially.

Standardization bodies, such as 3GPP and Open-Radio Access Network (O-RAN) Alliance, have been making efforts for ensuring wide scale deployment of energy efficient 5G and beyond 5G (B5G) networks. Energy saving (ES) techniques, such as advanced sleep mode (ASM) deployment and carrier and/or cell switch off and/or on are already considered functional by the mobile operators. However, these methods have been applied either manually or by using rule-based simplistic approaches. Data driven approaches, if trained with sufficient and appropriate data, have the potential to outperform classical optimization techniques in terms of performance and real-time inferences. What novel techniques artificial intelligence (AI) and/or machine learning (ML) will be leveraged for EE without any noticeable impact on the user Quality of Service (QOS) is also a terra incognita (e.g., has been an unexplored field of knowledge as it relates to communication networks).

Consequently, rather than resorting to hand-crafted design to achieve EE goals, provided herein is a network-wide data-driven decision-making approach that fundamentally leverages the benefits of artificial intelligence (AI) and/or machine learning (ML) techniques. Accordingly, the disclosed embodiments target AI and/or ML applications to the cell and/or carrier (referred to herein as cell/carrier) switch off and/or on (referred to herein as off/on) ES use case. As mentioned, in O-RAN WG1 (Work Group 1) latest documentation, ES can be attained by switching off/on one or more carriers, or even entire cells, at low load levels. A crucial associated decision managed by the respective E2 node is how to offload the existing users of the cell/carrier to new cells/carriers without impacting user experience. As the traffic demand in the network reduces in a candidate cell/carrier, it could be prudent to switch off that particular cell/carrier, thereby enabling the powering down of the entire data path associated with that cell/carrier, or potentially the entire radio unit (RU) for that candidate cell/carrier such that power can be saved at all levels including physical layer baseband processing.

However, making this decision is not a trivial task due to conflicting targets between user satisfaction and energy efficiency. Other cells/carriers will have to serve the additional network traffic and, further, the network traffic changes over time. E2 Nodes support a number of techniques that have an impact on energy consumption which might also be load dependent. While energy savings for the switched off cell/carrier is maximized, the overall energy consumption of the network might even increase. For this reason, the overall network energy efficiency should be considered along with acceptable limits of QoS degradation. The question at hand is how to design an efficient scheme (e.g., a rule, a policy, and so on) that performs the cell/carrier switch off/on in a multi-cell network with a diverse traffic demand that is varying both in spatio-temporal terms as well as applications having different QoS metrics and/or levels.

To overcome the above as well as related issues, provided herein is a data driven multi-cell network approach to maximize a long-term utility based on tradeoff between user QoS and network energy consumption. The framework provided herein performs dynamic cell/carrier switch off/on based on the traffic load threshold while also taking traffic trends and future prediction of each cell within the cluster under consideration. Provided is an optimization problem that considers a cluster of cells and targets to jointly optimize the cluster wide QoS and EE, with the tradeoff modeled through a parameter representing the network operator's intent. The solution provided herein includes a reinforcement learning (RL) based AI model that provides a dynamic and different traffic threshold for each cell within the cluster. The RL model takes information on cell load, traffic classes, user equipment (UE) locations, mobility patterns, future traffic predictions and energy consumption measures for making decisions on the thresholds for each cell. The designed solution plans to provide recommendations for cell/carrier switch off/on by maintaining the network changes, power consumption, and QoS ratio tradeoff as defined through the network operator's intent. The approaches discussed herein are expected to reduce the total cost of ownership (TCO) of the network operators, along with keeping long term operational expenditures (OPEX) low. In addition to this, mobile operators also reduce their carbon footprint and help achieve their sustainability objectives for future cellular networks. UE QoS and UE QoE are also improved as well as other processing efficiencies associated with the communication network.

In this regard for the avoidance of doubt, any embodiments described herein in the context of optimizing a function, a problem, a same network utility, a cluster, and so on, are not so limited and should be considered also to cover any techniques that implement underlying aspects or parts of the described aspects to improve or increase the function, the problem, the same network utility, the cluster, and so on, even if resulting in a sub-optimal variant obtained by relaxing aspects or parts of a given implementation or embodiment.

FIG. 1 illustrates a flow diagram of an example, non-limiting, computer-implemented method 100 that facilitates artificial intelligence enabled dynamic threshold-based cell/carrier switching for energy efficiency in advanced communication networks in accordance with one or more embodiments described herein. The computer-implemented method 100 and/or other methods discussed herein can be implemented by a system comprising a processor and a memory.

The computer-implemented method 100 begins, at 102, when, based on respective traffic load switching thresholds and respective results of a utility function determined for respective cells/carriers of a group of cells/carriers of a communication network, a cell/carrier from the group of cells/carriers is selected. The selection can include determining that a result of the utility function for the cell/carrier satisfies a parameter of the utility function. It is noted that when reference is made to a cell being switched on/off, the same or a similar concept can be utilized for carrier switch on/off, and vice versa.

For example, the computer-implemented method 100 can include determining the respective results of the utility function. Such determination can include determining a first percentage of energy efficiency savings of the group of cells/carriers as compared to a peak power consumption. Further, the determination of the respective results of the utility function can include determining a second percentage of user equipment quality of service achieved compared to a group of satisfied scenarios based on the switching policy defined for the cell/carrier and the respective switching policies of the other cells/carriers of the group of cells/carriers.

According to an implementation, the utility function can be based on an optimization function that facilitates a tradeoff between user equipment quality of service and cluster wide energy efficiency for the group of cells/carriers. The user equipment quality of service can be defined for respective user equipment classes of user equipment within the communication network.

Further, at 104, the computer-implemented method 100 can include causing a switching policy defined for the cell/carrier to be implemented. The switching policy can be implemented while other switching policies defined for the other cells/carriers of the group of cells/carriers are not implemented.

According to some implementations, the computer-implemented method 100 can be executed by a network intelligence controller that comprises a first agent and a second agent. The first agent can determine the respective traffic load switching thresholds. The second agent can determine the respective results of the utility function. For example, the first agent can determine the respective traffic load switching thresholds based on a first reinforcement learning model trained to a first defined level of confidence. Further, the second agent can determine the respective results of the utility function based on a second reinforcement learning model trained to a second defined level of confidence.

Figures 2A, 2B:
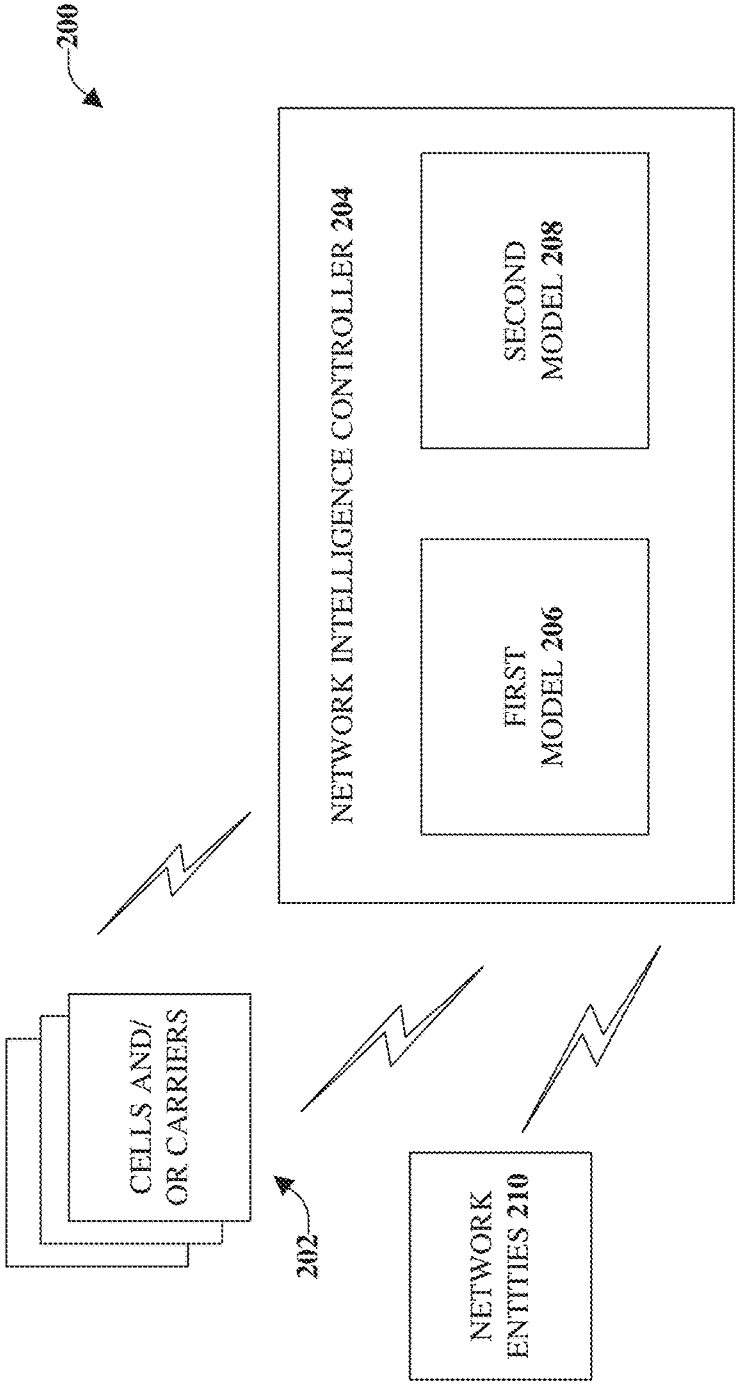
FIG. 2A illustrates an example, non-limiting, system for artificial intelligence enabled dynamic threshold-based cell and/or carrier switching for energy efficiency in advanced communication networks in accordance with one or more embodiments described herein.
FIG. 2B illustrates a first equation for a utility function in accordance with one or more embodiments described herein.

In further detail, FIG. 2A illustrates an example, non-limiting, system 200 for artificial intelligence enabled dynamic threshold-based cells/carriers switching for energy efficiency in advanced communication networks in accordance with one or more embodiments described herein.

It is noted that for purposes of explanation, some embodiments might be discussed with respect to an O-RAN framework. However, the disclosed embodiments are not limited to an O-RAN framework implementation and, instead, other types of disaggregated architecture can be utilized with the various embodiments discussed herein. Further, as it relates to the O-RAN framework, the network equipment can include, but is not limited to, O-RAN Radio Units (O-RUs), O-RAN Control Units (O-CUs), O-RAN Distributed Units (O-DUs), and/or Random Access Network Intelligent Controllers (RICs). Further, the network automation tools include, but are not limited to, rApps and/or xApps.

The system 200 includes one or more cells/carriers 202 and a single network intelligent controller (NIC 204). For purposes of describing the disclosed embodiments, it is assumed that the one or more cells/carriers 202 (also referred to as a cluster of base stations (BSs) and/or a cluster of cells) are being managed by the single NIC 204. The NIC 204 can include two reinforcement learning (RL) based applications, illustrated as a first model 206 and a second model 208. The first model 206 can be configured to determine the cells/carriers load threshold for each cell/carrier of the one or more cells 202 (e.g., for each BS of the cluster of BSs, for each cell/carrier) to be switch off/on.

Upon or after the first model 206 determines the threshold, the second model 208 can take the threshold values, along with the existing cells/carriers load levels and other network environment statistics, to decide the cell/carrier switching policy (e.g., whether the cell/carrier should be switched off or on) to be transferred back to one or more network entities 210. If the policy is accepted, the cell/carrier switching policy (e.g., on and/or off) is implemented and the new state metrics along with the cluster level key performance indicators (KPIs) which determine the rewards for both applications (e.g., the first model, the second model) is communicated to the NIC 204. The overall goal of such a loop (e.g., feedback loop) is to work iteratively with the dynamic environment and train models that can work in tandem for improving the cluster utility.

According to an implementation, provided is a network intent-based utility as an optimization function which provides a tradeoff between the user QoS and cluster wide EE. The QOS measures and the limits for satisfactory performance are defined individually for each UE class. The utility function of the RL agent is based on long term performance statistic per cell/carrier to avoid single shot decision making and to mitigate sudden traffic spikes from historical data under consideration, as the decision for cell/carrier switching (e.g., off or on) is a non-real-time action spanning a few minutes to a few hours or longer.

In another implementation, instead of a uniform cell/carrier switching policy for the entire cluster, the embodiments provided herein utilize different thresholds for each cell/carrier. For example, the optimal threshold can take into consideration the prior cell specific traffic trends, the load patterns of nearby cells, and the distribution of UE traffic classes within the cell.

As discussed herein, an embodiment utilizes two RL applications which work together to recommend cell/carrier switching policies. Upon or after the carrier/cell specific thresholds are determined by the first application (e.g., the first model 206), another RL based application (e.g., the second model 208) finalizes the cell/carrier switching policy recommendation and selects a cell/carrier to be switched off, if one or more cell/carrier meets the traffic threshold for switching off. Alternatively, or additionally, upon or after the carrier/cell specific thresholds are determined by the first application (e.g., the first model 206), another RL based application (e.g., the second model 208) finalizes the cell/carrier switching policy recommendation and selects a cell/carrier to be switched on, if one or more cell/carrier meets the traffic threshold for switching on. It is noted that only a single cell/carrier is switched off/on in a decision interval to avoid rapid re-assignment of UEs between cell/carrier and to avoid any sudden degradation in UE QoS.

Particularly, FIG. 2B illustrates a first equation 212 for a utility function in accordance with one or more embodiments described herein. The second RL based application attempts to maximize the utility function 200. In further detail, the utility function 200 is a product of the percentage of EE savings (in comparison to the peak power consumption), and a percentage of UEs for which QoS is achieved (in comparison to all satisfied scenarios) as a result of the cell/carrier switch off/on actions.

The general concept of cell/carrier switch off/on implementation in cellular networks in durations of low traffic is known. However, these activities are based on manual interventions or static thresholds of traffic. The static threshold-based approach is unable to handle the dynamicity of the network environment, and the inter-dependency of neighbor cell statistics when improving a cluster wide network utility that integrates both the ES factor as well as the user QoS.

The first component of the various embodiments is the network-intent based optimization function which is a tradeoff between cluster level EE and average user QoS. The user QoS is dependent on the device class considering that at a given time instance, each UE is requesting an application with a defined KPI parameter and quality satisfaction threshold. In some implementations, the network is servicing different UE traffic classes with diverse performance indicator (e.g., KPI) limits such as, for example, maximum allowable latency, minimum throughput, packet loss, and so on, simultaneously. The QoS associated with the data radio bearers (DRBs) enable various 5G services (e.g., enhanced mobile broadband (eMBB), ultra reliable and low latency communication (URLLC), massive machine type communications (mMTC)). Therefore, the device/UE class is just an extension of the QoS flow within 5G NR and the different minimum QoS and/or KPI criteria each needs to be satisfied.

From the implementation perspective, the gNB can configure the UE QoS flow to the DRB mapping rule through one or more radio resource control (RRC) reconfiguration messages. For UEs with different requirements (e.g., throughput, latency, packet delay, packet loss, and so on), the UEs will be mapped to different QoS Flow Identifiers (QFIs). For example, real-time gaming applications (e.g., enhanced Mobile Broadband (eMBB)) as per 3GPP has a QFI value of 3 with packet error rate and packet delay budget targets of 10-3 and 50 milliseconds, respectively. On the other hand, low latency Augmented Reality (AR) applications (e.g., Ultra-reliable low-latency communications (URLLC)) have a QFI value of 80 with packet error rate and packet delay budget targets of 106 and 10 milliseconds, respectively. Both the QoS flows are mapped to the DRBs in the access networks where there can be one or more QoS flows with different levels of priority, data rate, latency, and so on within a single DRB. When referring to a UE device class, it is implying that devices are requesting for applications with different KPIs and target levels, so their satisfaction must be measured across the relevant KPIs.

Also, there can be weightage distribution across QoS flows such that when a UE with a higher QFI application is not satisfied, the penalty to the utility function is higher, as compared to another UE using a lower QFI service/app. In an example, within the utility function, when the UE falls out of coverage, the QoS penalty can be significantly higher than the QOS penalty that is incurred when the system just does not meet the QoS requirement.

In further detail, aspect of the cell switch off/on scenario where UEs may potentially fall out of coverage due to actions taken by the RL agents is considered. To cater for this scenario, the QoS metric includes a penalty term which penalizes for the loss of coverage to the number of UEs rendered out of coverage due to cell/carrier switch off/on action. The penalty factor weightage would be higher than the positive reward for meeting the QoS requirement for the UEs since the agent should learn to avoid throwing UEs out of coverage with their cell/carrier switch off/on actions. In an implementation, the network can track RRC connected UEs within the cell/cluster and if the UEs lose the RRC connected state because they could not be handed over to other cells/carriers before switch off, they will be counted as UEs losing coverage due to cell/carrier switch off. Consequently, the RL agent will be rewarded negatively within the QoS part of the utility function to reflect this unwanted network behavior.

FIG. 3 illustrates a second equation 300 for a cluster wide optimization function in accordance with one or more embodiments described herein. Mathematically, the cluster wide optimization function (e.g., the second equation 300) is NP-hard. The details of the variables used in the second equation 300 will now be described. Variable N represents the number of cells in the cluster. Variable $P_k$ represents the power consumption of cell k in the cluster. Variable $P_o$ represents the peak power consumption of a cell considering full transmission on all time and frequency slots and considering same maximum power for all cells. Variable C represents the number of UE device classes. Variable $|Cn|$ represents the cardinality of a UE device class, for example, the number of UEs in a device class. Variable $W_n$ represents the weightage of the UE device class, e.g., violating the QoS for URLLC devices may be more critical so it may be assigned a higher weightage than other UE device class and/or QoS flows. Variable $QoS_{n,m}$ represents a binary indicator specifying the QoS per UE, for example, whether a UE has satisfied the QoS criteria (1 if satisfied and 0 if not satisfied). Variable $|UE|$ represents cardinality of the UE set, for example, total number of UEs in the cluster. Further, variables $\alpha$, $\beta$ represent the KPI tradeoff variables between EE and user QoS, respectively.

The following describes the network model in accordance with one or more embodiments. The network can include a number of cells with one or more carriers serving a diverse set of UEs with varying demands. As the traffic generated per cell varies through the day based on the active number of UEs and also the types of application (QFI) generating the data requirement, the cells/carriers which are serving low traffic loads may be switched off to reduce and/or mitigate the overall cluster power consumption. The switch off occurs after steering the already connected UEs to nearby suitable cells/carriers to avoid any disruption in their service. The application (e.g., model) utilizes characteristics of the cell cluster including current power consumption levels, cell loads, UE distributions, QoS values, and neighbor cell loads to determine a cells/carriers load threshold for switching off/on. This threshold can be uniquely determined for every cell/carrier and is determined by the characteristics of the cell traffic. For example, in a scenario where a cell/carrier is tightly loaded and is serving low priority traffic (through device class, QFI values), it may be assigned a lower switching threshold which increases its chances of being switched off. On the other hand, another cell/carrier with a higher traffic load or one that carries critical or high UE device class priority generated traffic will be assigned a higher switching threshold to reduce its chances of being switched off. The threshold can be a function of PRB utilization, number of active UEs connected to the cell/carrier, percentage of high UE device class traffic on the cell/carrier, amount of traffic generated in the cell/carrier, and so forth.

As it relates to a data driven learning paradigm, the various embodiments consider training of two separate reinforcement learning based models: one reinforcement learning model for determining the optimal cell/carrier level load threshold for cell/carrier switching decisions, and the other reinforcement learning model for determining the best cell/carrier switching policy out of a group of policies from different cells/carriers. Since the overall objective is to maximize the utility outlined in the second equation 300, both the models play important roles, the first one in finding the right tradeoff between EE and user QoS per cell/carrier, while the second one takes the cluster level picture in consideration and determining cluster level policy to maximize the network utility. RL based models are utilized because they are known to adapt well to rapidly changing environments. They are also suitable for environments where large sets of training data are not available and can be trained during the model interaction with the environment. Since the environment, particularly the channel conditions between UEs and cells which change in small-scale time intervals and can never be determined by a mathematical formula, the state space becomes extremely large. In such cases, deep Q-learning models are suited where neural networks approximate the Q-function that estimates the cumulative reward for every action in a given state. The neural network is updated iteratively by employing a combination of exploration and exploitation strategies. To enhance the performance and stability of the deep Q network (DQN) models, experience replay and target models are also implemented in the training process. The experience replay stores past experiences and uses a random subset of those to update the Q-network, instead of using only the most recent experience. Target network is used in DON to stabilize the learning process, since the exact value function in Q-learning is replaced by a function approximator in DON that updates multiple state/action values in each learning episode.

The state space, action space, and rewards for both models will now be provided. The first model (e.g., the first model 206) is configured to determine the optimal cell/carrier switching threshold. The state space of the first model can include the following:

State Space:

- UE/cell locations
- cell Adjacency Matrix
- Cell load statistics
- Per UE device class QoS thresholds
- UE Traffic class distribution per cell/carrier
- UE KPI metrics (throughput, latency)
- UE mobility measurements
- Handover (HO) statistics
- Future traffic predictions (generated through a predictive model, such as RNN or LSTM AI models)
- Received signal power measures (RSRP/RSRQ)
- Channel Quality Indicator (CQI) measurements
- Signal-to-interference-and-noise ratio (SINR) measurements
- Cell/carrier power consumption metrics
- Cell/carrier PRB utilization metrics The action space of the first model can include the following:

Action Space: Continuous value between 0 and 1 representing cell/carrier load ratio where 0 is No Load while 1 is maximum load on the cell/carrier.

FIG. 4 illustrates a third equation 400 for the reward assigned to the RL applications in accordance with one or more embodiments described herein. The reward for the first model is the product of percentage EE savings and the percentage UE QOS achieved, scaled with the network operator intent-based importance parameters. For example, the parameter $\alpha$ represents EE and the parameter $\beta$ represents QoS. The parameters $\alpha$ and $\beta$ are configurable.

The second model (e.g., the second model 208) is configured to determine the optimal cell/carrier switching policy. The state space of the second model can include the following:

State Space:

- All the measurements from State Space of RL Model-1
- Cluster level KPI metrics
- Cluster level power measurement metrics
- Cell/carrier switch on/off policies for each cell/carrier
- Cell/carrier thresholds generated at random for each cell/carrier The action space of the second model can include the following:

Action Space: Selection of a single cell/carrier switching policy out of a group of policies input as part of the State Space.

The reward for the second model is determined by the third equation 400 of FIG. 4. For example, the rewards for the first model and the second model are determined using the same equation.

According to some implementations, both DQN models are trained independently on network digital twins that emulate the properties of an actual network cluster. RL Model-1 (e.g., the first model) uses the network statistics in its state space to train itself to find the optimal cell/carrier switching load threshold. RL Model-2 (e.g., the second model) takes randomly generated policies from the digital twin along with the state space metrics of RL Model-1 to learn the optimal cell/carrier switching policy. By training the models on a variety of traffic load scenarios and random policy configurations, the models can be fine-tuned to optimize the same network utility with their respective actions.

As it relates to model deployment and retraining, upon or after the models are trained, the models can be deployed within a central network controller entity (e.g., the network intelligent controller 204) that is recommending policies for the joint EE-QoS optimization of the cluster. The models are deployed together in cascade where the RL Model-1 first generates per cell/carrier switching load thresholds followed by the RL Model-2 which uses these values along with the cluster level metrics to finalize cell/carrier switching policies, which allows the network configuration to either recommend no change or at maximum a single change in the cell/carrier switching configuration. The difference between the two models is that RL Model-1 provides cell/carrier level action values (based on cell/carrier level load distributions, UE device class distribution etc.), while RL Model-2 provides cluster wide cell/carrier switching policies.

Figure 5:
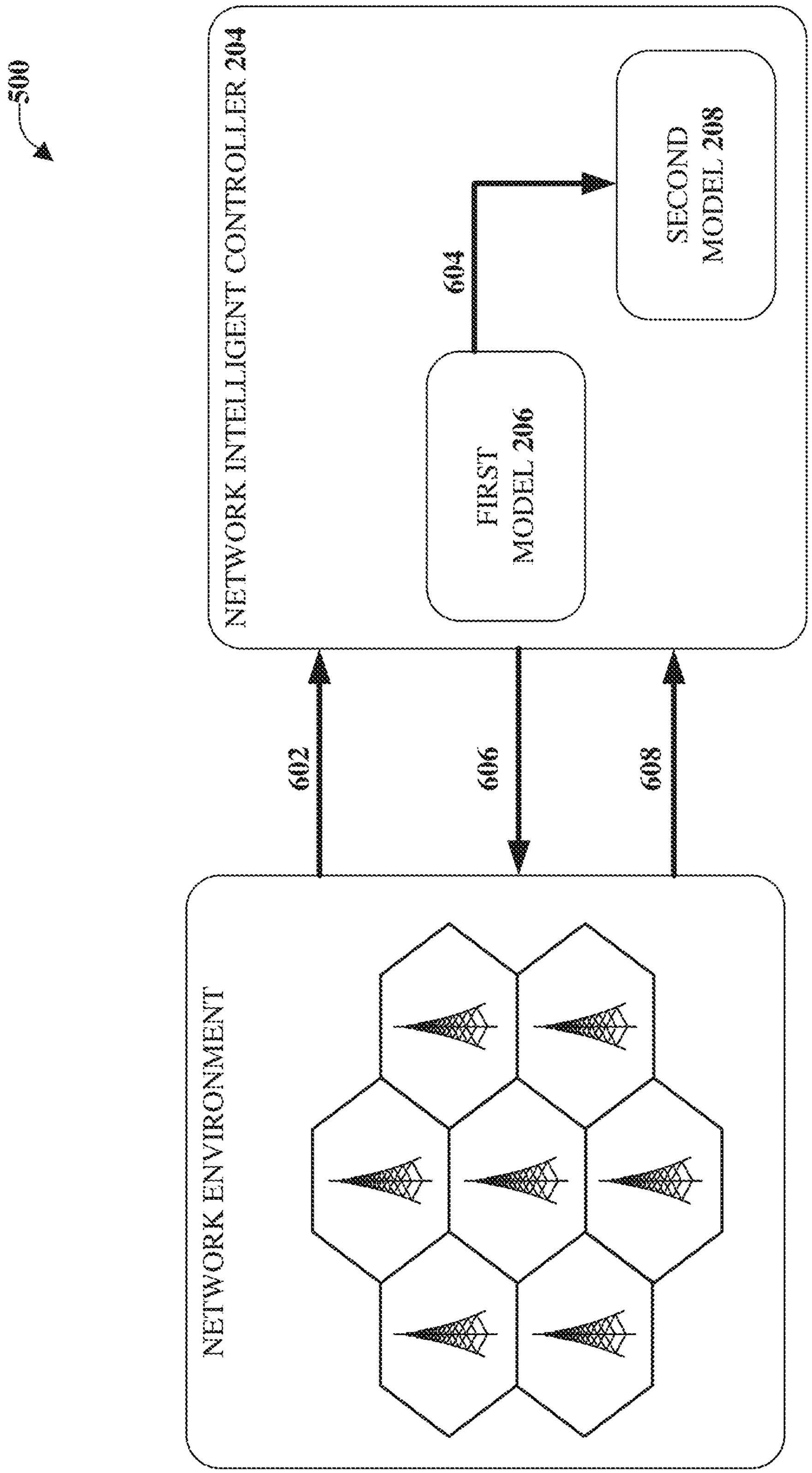
FIG. 5 illustrates an example, non-limiting, system for deployment of reinforcement learning models to facilitate dynamic threshold-based switching policies for energy efficiency in advanced communication networks in accordance with one or more embodiments described herein.

FIG. 5 illustrates an example, non-limiting, system 500 for deployment of reinforcement learning models to facilitate dynamic threshold-based switching policies for energy efficiency in advanced communication networks in accordance with one or more embodiments described herein. Repetitive description of like elements employed in other embodiments described herein is omitted for sake of brevity. The system 500 can comprise one or more of the components and/or functionality of the system 200 and vice versa.

Figure 6:
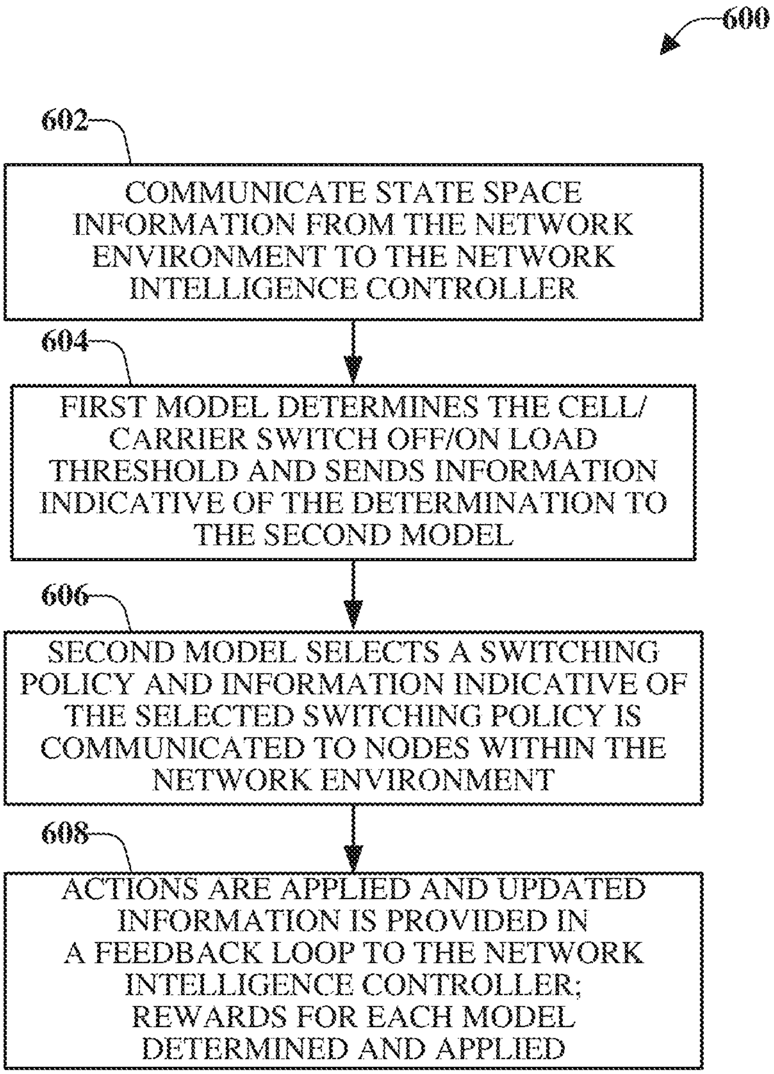
FIG. 6 illustrates an example, non-limiting, method for deployment of reinforcement learning models to facilitate dynamic threshold-based switching policies for energy efficiency in advanced communication networks in accordance with one or more embodiments described herein.

As illustrated, the system 500 includes a network environment 502 that includes multiple base stations that serve respective geographic areas. The system 500 also includes the network intelligence controller 204, which includes the first model 206 and the second model 208. Reference is also made to FIG. 6, which illustrates an example, non-limiting, method 600 for deployment of reinforcement learning models to facilitate dynamic threshold-based switching policies for energy efficiency in advanced communication networks in accordance with one or more embodiments described herein, the deployment of the models (e.g., the first model 206 and the second model 208) will be discussed.

At 602, state space information is communicated from the network environment 502 to the network intelligence controller 204. For example, information indicative of network statics and/or other state space information can be transferred to the network intelligence controller 204. The data transferred can include power consumption metrics, QoS metrics, mobility metrics, and so on.

Further, at 604, the first model 206 determines the cell/carrier switching load threshold and sends information indicative of the determination to the second model 208. For example, application 1 (e.g., the first model 206), based on a trained RL Model-1, infers the cell/carrier switching load threshold and sends these cell/carrier thresholds to Application 2 (e.g., the second model 208).

The second model 208 selects a switching policy and information indicative of the selected switching policy is communicated to the nodes within the network environment 502, at 606. In further detail, Application 2 (e.g., the second model 208), based on trained RL Model-2, infers the optimal cell/carrier switching policy (e.g., a policy related to whether a cell/carrier should be switched "on" or "off"). The inferred policy is then sent by the network intelligence controller 204 to relevant nodes within the network environment 502.

At 608, actions are applied and updated information is provided in a feedback loop to the network intelligence controller 204. Further, rewards for each model are determined and applied. In further detail, the network environment 502 applies the actions (determined at 506) and sends updated statistics (State Space) along with the QoS and Power consumption metrics after the application of recommended policy. The rewards for each application (e.g., each mode) are determined by the network intelligence controller 204 and forwarded to the applications for policy refinement in the next episode (e.g., as a retraining and refinement process).

Model retraining might be required if the RL models yield policies that are negatively impacting the cluster wide utility and/or not generating the required network performance improvements. The retraining involves updating the models with new data. Such retraining can be performed offline via a digital twin environment. The retraining process may be performed manually or could be automated as part of machine learning operations (ML Ops) procedures.

Figure 7:
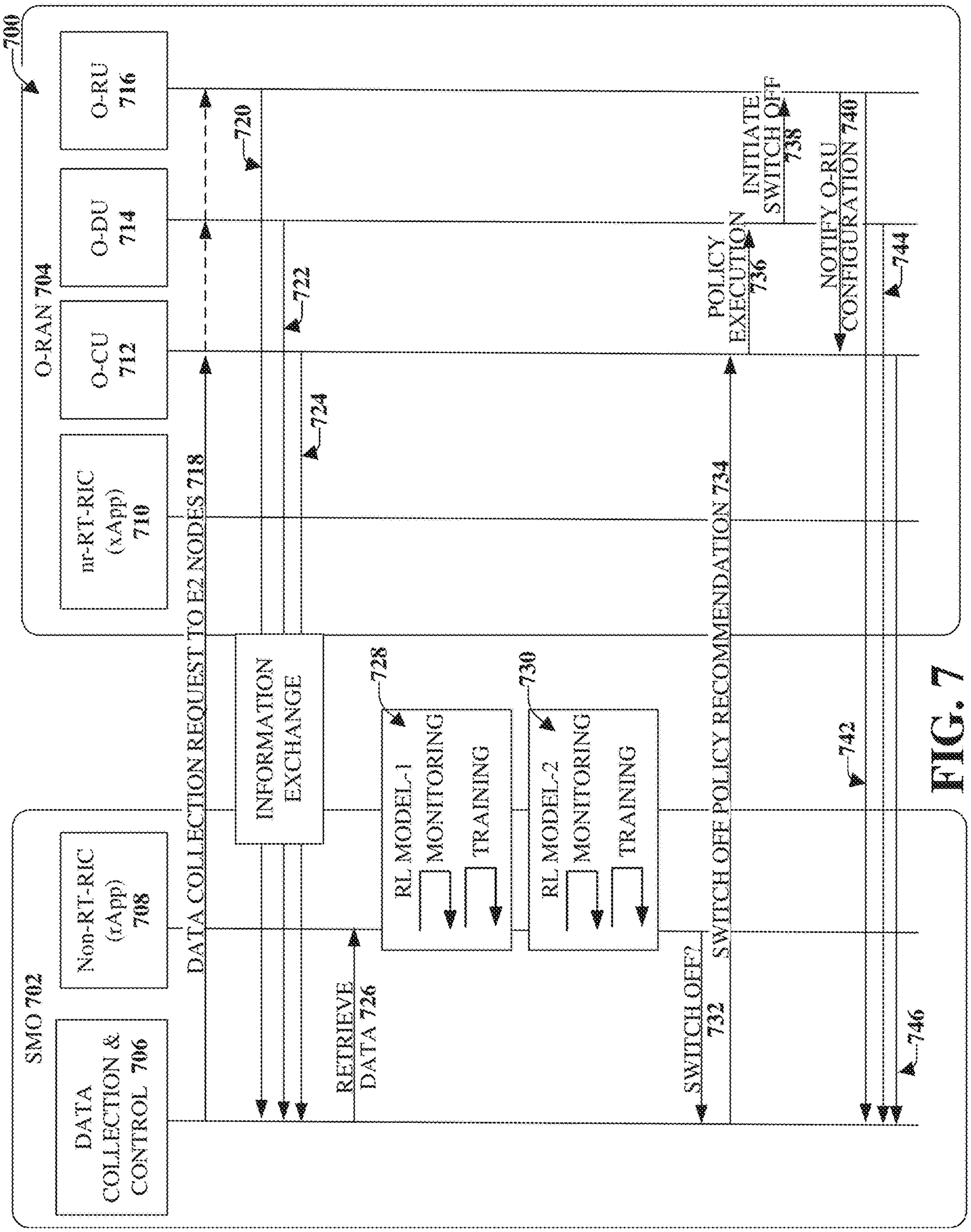
FIG. 7 illustrates an example, non-limiting, message sequence flow chart that can facilitate artificial intelligence enabled dynamic threshold-based switching in accordance with one or more embodiments described herein.

FIG. 7 illustrates an example, non-limiting, message sequence flow chart 700 that can facilitate artificial intelligence enabled dynamic threshold-based switching in accordance with one or more embodiments described herein. The message sequence flow chart 700 can be utilized for new radio, 5G, beyond 5G, and/or other advanced communication protocols, as discussed herein.

In the illustrated embodiment of FIG. 7, the proposed framework can be implemented as a disaggregated framework such as Open RAN (O-RAN). As illustrated, the message sequence flow chart 700 represents the message sequence between network equipment including a Service Management and Orchestration (SMO 702) and an O-RAN 704. The SMO 702 includes a data collection and control component (DCC 706) and a non-Real-Time-RIC (non-RT-RIC 708), which can be implemented as an rApp according to an implementation. The O-RAN 704 includes a near-Real-Time-RIC (nr-RT-RIC 710), which can be implemented as an xApp according to an implementation. The O-RAN 704 can also include an Open RAN control unit (O-CU 712), an Open RAN distributed unit (O-DU 714), and an Open RAN radio unit (O-RU 716).

As mentioned, the proposed framework can be implemented as a disaggregated framework such as Open RAN (O-RAN) where the non-real-time radio intelligent controller (non-RT-RIC 708) hosts both RL applications (e.g., the first model and the second model). The first application (e.g., the first model) can determine the cell specific traffic thresholds for cell/carrier switch off/on. The second application (e.g., the second model) can generate the policy recommendation based on optimal perceived utility gain which is forwarded to the O-CU 712.

The disaggregated architecture in O-RAN is suitable for deployment of such applications as the modular architecture makes it easier to deploy new applications and features to scale the network or manage and/or automate its performance. The choice of deploying the applications (models) in an embodiment as rApps within the non-RT-RIC 708 is that the closed-loop control required for cell/carrier switch off/or is greater than around 1 second. Since the cell/carrier switch off/on takes place for longer time scales (e.g., usually 15 minutes or more), implementing the cell/carrier switch off/on through the non-RT-RIC 708 is more practical than the nr-RT-RIC 710, which has a control feedback loop of less than 1 second.

With continuing reference to FIG. 7, the DCC 706 sends a data collection request to the E2 nodes, at 718. The request is sent to the O-CU 712, the O-DU 714, and the O-RU 716. Upon or after receipt of the request at 718, information exchange occurs where the O-RU 716, the O-DU 714, and the O-CU 712, and send information (indicated at 720, 722, and 724, respectively) to the DCC 706. The information exchange can include the exchange of information indicative of UE level performance metrics, cell/carrier level power consumption metrics, cell/carrier load, channel states, MCS, data, mobility metrics, and so on. As indicated at 726, the non-RT-RIC 708 retrieves data from the DCC 706.

Training and inference of RL Model-1 (e.g., the first model) occurs at 728. For the training and inference, monitoring is performed. The monitoring includes QoS and power consumption metrics monitoring. Upon or after the monitoring, training is performed. The training includes RL Model-1 training and inference.

Upon or after the training and inference of the first model, training, and inference of RL Model-2 (e.g., the second model) occurs at 730. For the training and inference, monitoring is performed. The monitoring includes QoS and power consumption metrics monitoring. Upon or after the monitoring, training is performed. The training includes RL Model-2 training and inferences.

It is noted that although the training and inference is discussed as occurring at a specific time, training can occur prior to inference. It is noted that the first model and second model can be trained individually to a defined level of confidence.

Upon or after the training and inference of the first model and the second model, information indicative of a request to execute cell/carrier switch off/on can be conveyed, at 732, to the DCC 706. For example, the second model can select a switching policy for implementation at a defined cell/carrier. The DCC 706 can determine whether or not the policy should be implemented. If the policy should be implemented, at 734, the DCC 706 sends information indicative of the cell/carrier switching policy recommendation to the O-CU 712. Upon or after receipt of the policy, the O-CU executes the policy, as indicated at 736. Further, at 738, the O-CU 714 can initiate switch off/on at the O-RU 716.

Upon or after the switch off/on has occurred, the O-RU 716 can send updated information (e.g., configuration) to the nr-RT-RIC, as indicated at 740. Further, information exchange can occur between the O-RU 716, the O-DU 714, the O-CU 712, and the DCC 706, as indicated at 742, 744, and 746.

Figure 8:
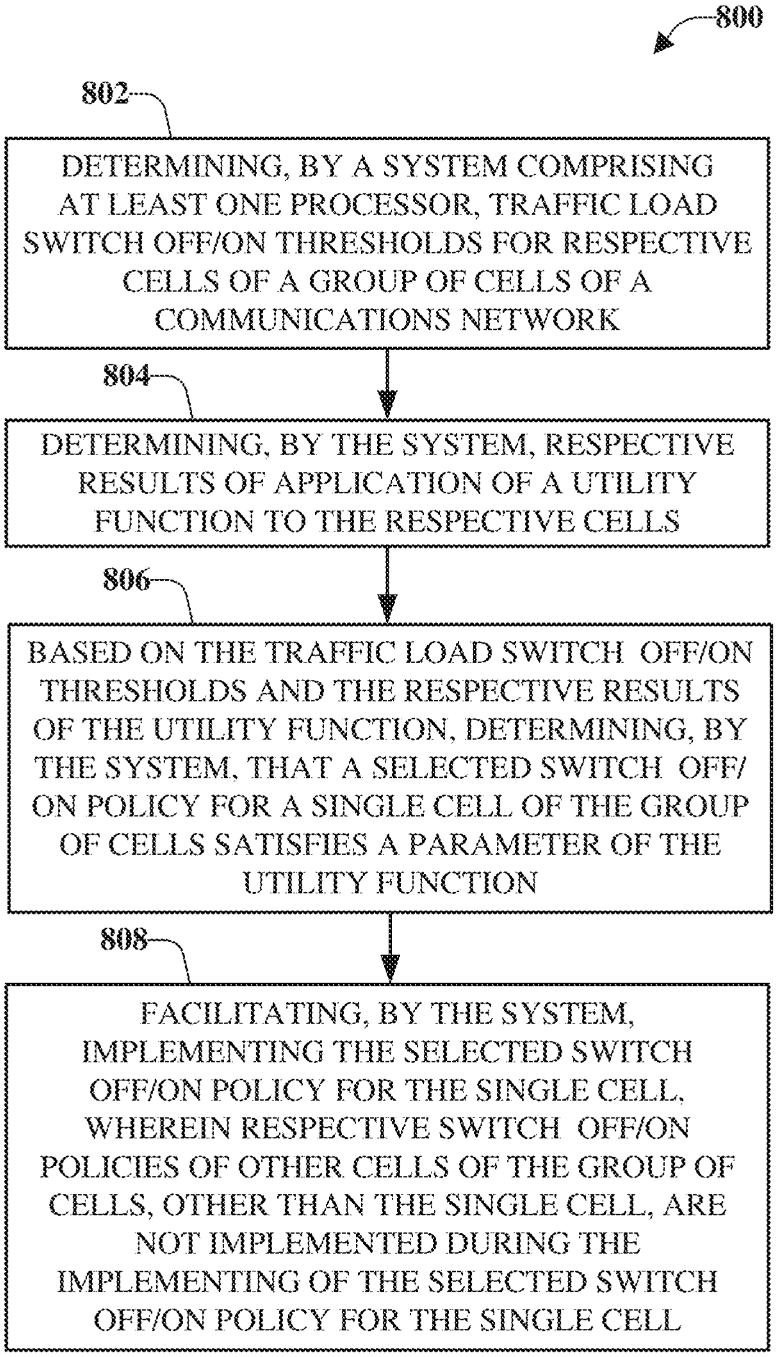
FIG. 8 illustrates a flow diagram of an example, non-limiting, computer-implemented method that facilitates artificial intelligence enabled dynamic threshold-based cell and/or carrier switching for energy efficiency in advanced communication networks in accordance with one or more embodiments described herein.

FIG. 8 illustrates a flow diagram of an example, non-limiting, computer-implemented method 800 that facilitates artificial intelligence enabled dynamic threshold-based cell and/or carrier switching for energy efficiency in advanced communication networks in accordance with one or more embodiments described herein. The computer-implemented method 800 and/or other methods discussed herein can be implemented by a system comprising a processor and a memory. In an example, the system can be implemented by a network equipment of a disaggregated network architecture. It is noted that the embodiment of FIG. 8 is discussed with respect to being deployed within an O-RAN framework, however, the disclosed embodiments are not limited to an O-RAN framework.

The computer-implemented method 800 can include, at 802, determining, by a system comprising at least one processor, traffic load switching thresholds for respective cells of a group of cells of a communications network. Thus, each cell is assigned a traffic switching threshold. At 804, the system determines respective results of application of a utility function to the respective cells.

Based on the traffic load switching thresholds and the respective results of the utility function, at 806, the computer-implemented method includes determining, by the system, that a selected switching policy for a single cell of the group of cells satisfies a parameter of the utility function.

Further, at 808 the computer-implemented method includes facilitating, by the system, implementing the selected switching policy for the single cell, wherein respective switching policies of other cells of the group of cells, other than the single cell, are not implemented during the implementing of the selected switching policy for the single cell.

According to some implementations, prior to determining the respective results of application of the utility function at 804, the computer-implemented method 800 can include, determining, by the system, candidate cells of the group of cells for implementation of the respective switching policies. The candidate cells can include the single cell and the other cells of the group of cells. Further, prior to facilitating the implementing of the selected switching policy for the single cell at 808, the computer-implemented method 800 can include, selecting, by the system, the single cell based on a result of the respective results associated with the single cell being determined to maximize the utility function as compared to respective other results of the respective results determined for the other cells.

In an example, the selected switching policy for the single cell is a policy that switches off the single cell. Further to this example, the method can include, prior to the facilitating the implementing of the selected switching policy for the single cell, implementing a handover of user equipment from the single cell being switched off to a nearby cell. The nearby cell can be selected from the group of cells based on a determination that, prior to the single cell being switched off, a received power level at the user equipment, provided by the nearby cell, satisfies a defined received power level.

In accordance with some implementations, determining of the respective results of the application of the utility function at 804 can include determining a first percentage of energy efficiency savings of the group of cells as compared to a peak power consumption. Determining the respective results can also include determining a second percentage of user equipment quality of service achieved compared to a group of satisfied scenarios as a result of the selected switching policy for the single cell and the respective switching policies of the other cells of the group of cells.

Implementing of the selected switching policy for the single cell at 808 can include, according to some implementations, performing one of the following. Based on a first determination that a current traffic load of the single cell fails to satisfy a determined traffic load switching threshold for the single cell and the single cell is in an active state, facilitating changing a state of the single cell from the active state to an inactive state. Alternatively, based on a second determination that the current traffic load of the single cell fails to satisfy a determined traffic load switching threshold for the single cell and the single cell is in the inactive state, facilitating maintaining the single cell in the inactive state. Alternatively, based on a third determination that the current traffic load of the single cell satisfies the determined traffic load switching threshold for the single cell and the single cell is in the inactive state, facilitating changing the state of the single cell from the inactive state to the active state. Alternatively, based on a fourth determination that the current traffic load of the single cell satisfies the determined traffic load switching threshold for the single cell and the single cell is in the active state, facilitating maintaining the single cell in the active state.

In some implementations, the utility function is based on an optimization function that facilitates a tradeoff between user equipment quality of service and cluster wide energy efficiency for the group of cells. Further to these implementations, the user equipment quality of service is defined for respective user equipment classes of user equipment within the communications network.

According to some implementations, determining of the traffic load switching thresholds at 802 is based on a first reinforcement learning model. In addition, facilitating of the implementing of the selected switching policy for the single cell at 808 is based on a second reinforcement learning model. Further to these implementations, the computer-implemented method 800 can include, after facilitating the implementing of the selected switching policy for the single cell, receiving, by the system, first information indicative of state metrics and second information indicative of performance indicators. Further, the computer-implemented method 800 can include determining, by the system, a first reward value to apply to the first reinforcement learning model and a second reward value to apply to the second reinforcement learning model.

In an example, the communications network is deployed as a disaggregated architecture that comprises central units, distributed units, and a near-real-time-radio access network intelligent controller. In another example, the group of cells is configured to operate according to a new radio network communication protocol, a fifth generation network communication protocol, or another advanced communication protocol.

It should be noted that terms such as "real-time," "near real-time," "dynamically," "instantaneous," "continuously," and the like can refer to data which is collected and processed at an order without perceivable delay for a given context, the timeliness of data or information that has been delayed only by the time required for electronic communication, actual or near actual time during which a process or event occur, and temporally present conditions as measured by real-time software, real-time systems, and/or high-performance computing systems. Real-time software and/or performance can be employed via synchronous or non-synchronous programming languages, real-time operating systems, and real-time networks, each of which provide frameworks on which to build a real-time software application. A real-time system may be one where its application can be considered (within context) to be a main priority. In a real-time process, the analyzed (input) and generated (output) samples can be processed (or generated) continuously at the same time (or near the same time) it takes to input and output the same set of samples independent of any processing delay.

Example, non-limiting Non-Real Time RAN Intelligent Controller (Non-RT RIC) functions include service and policy management, RAN analytics, and model training for the near-Real Time RICs. In this regard, the Non-RT-RIC enables non-real-time (e.g., a first range of time, such as >1 second) control of RAN elements and their resources through applications, e.g., specialized applications called rApps. Example, non-limiting Near-Real Time RAN Intelligent Controller (Near-RT RIC) functions enable near-real-time optimization and control and data monitoring of O-CU and O-DU nodes in near-RT timescales (e.g., a second range of time representing less time than the first time range, such as between 10 milliseconds and 1 second). In this regard, the Near-RT RIC controls RAN elements and their resources with optimization actions that typically take about 10 milliseconds to about one second to complete, although different time ranges can be selected. The Near-RT RIC can receive policy guidance from the Non-RT-RIC and can provide policy feedback to the Non-RT-RIC through specialized applications called xApps. In this regard, a Real Time RAN Intelligent Controller (RT RIC) is designed to handle network functions at real time timescales (e.g., a third range of time representing less time than the first time range and the second time range, such as <10 milliseconds).

Methods that can be implemented in accordance with the disclosed subject matter will be better appreciated with reference to the flow charts provided herein. While, for purposes of simplicity of explanation, the methods are shown and described as a series of flows and/or blocks, it is to be understood and appreciated that the disclosed aspects are not limited by the number or order of flows and/or blocks, as some flows and/or blocks can occur in different orders and/or at substantially the same time with other blocks from what is depicted and described herein. Moreover, not all illustrated flows and/or blocks are required to implement the disclosed methods. It is to be appreciated that the functionality associated with the flows and/or blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Aspects of systems, devices, apparatuses, and/or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the system can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

As used herein, the term "storage device," "first storage device," "second storage device," "storage cluster nodes," "storage system," and the like (e.g., node device), can include, for example, private or public cloud computing systems for storing data as well as systems for storing data comprising virtual infrastructure and those not comprising virtual infrastructure. The term "I/O request" (or simply "I/O") can refer to a request to read and/or write data.

The term "cloud" as used herein can refer to a cluster of nodes (e.g., set of network servers), for example, within an object storage system, which are communicatively and/or operatively coupled to one another, and that host a set of applications utilized for servicing user requests. In general, the cloud computing resources can communicate with user devices via most any wired and/or wireless communication network to provide access to services that are based in the cloud and not stored locally (e.g., on the user device). A typical cloud-computing environment can include multiple layers, aggregated together, that interact with one another to provide resources for end-users.

Further, the term "storage device" can refer to any Non-Volatile Memory (NVM) device, including Hard Disk Drives (HDDs), flash devices (e.g., NAND flash devices), and next generation NVM devices, any of which can be accessed locally and/or remotely (e.g., via a Storage Attached Network (SAN)). In some embodiments, the term "storage device" can also refer to a storage array comprising one or more storage devices. In various embodiments, the term "object" refers to an arbitrary-sized collection of user data that can be stored across one or more storage devices and accessed using I/O requests.

Further, a storage cluster can include one or more storage devices. For example, a storage system can include one or more clients in communication with a storage cluster via a network. The network can include various types of communication networks or combinations thereof including, but not limited to, networks using protocols such as Ethernet, Internet Small Computer System Interface (iSCSI), Fibre Channel (FC), and/or wireless protocols. The clients can include user applications, application servers, data management tools, and/or testing systems.

As utilized herein an "entity," "client," "user," and/or "application" can refer to any system or person that can send I/O requests to a storage system. For example, an entity, can be one or more computers, the Internet, one or more systems, one or more commercial enterprises, one or more computers, one or more computer programs, one or more machines, machinery, one or more actors, one or more users, one or more customers, one or more humans, and so forth, hereinafter referred to as an entity or entities depending on the context.

Figure 9:
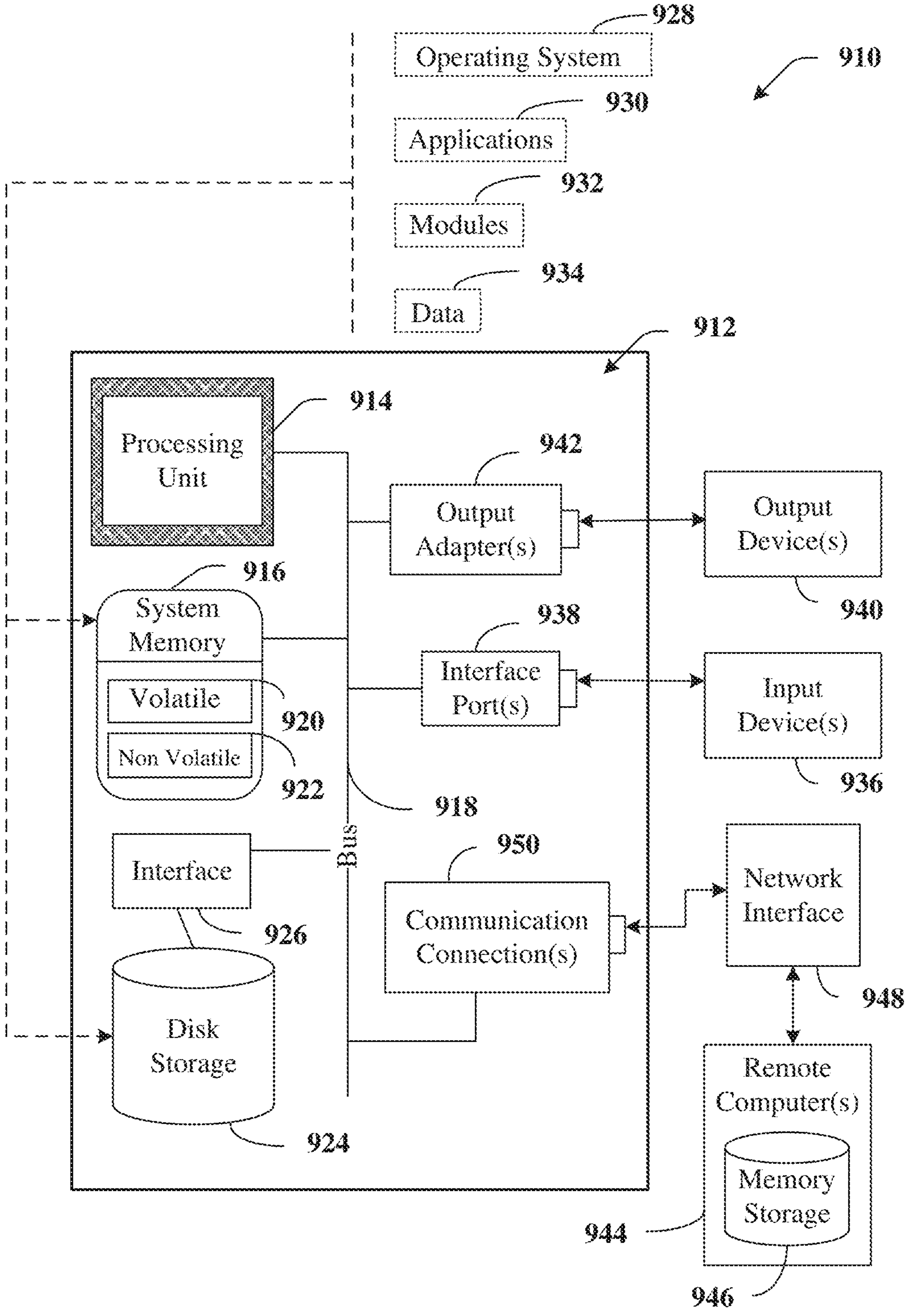
FIG. 9 illustrates an example, non-limiting, computing environment in which one or more embodiments described herein can be facilitated.

In order to provide a context for the various aspects of the disclosed subject matter, FIG. 9 as well as the following discussion are intended to provide a brief, general description of a suitable environment in which the various aspects of the disclosed subject matter can be implemented.

With reference to FIG. 9, an example environment 910 for implementing various aspects of the aforementioned subject matter comprises a computer 912. The computer 912 comprises a processing unit 914, a system memory 916, and a system bus 918. The system bus 918 couples system components including, but not limited to, the system memory 916 to the processing unit 914. The processing unit 914 can be any of various available processors. Multi-core microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 comprises volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can comprise read only memory (ROM), programmable ROM (PROM), electrically programmable ROM (EPROM), electrically erasable PROM (EEPROM), or flash memory. Volatile memory 920 comprises random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also comprises removable/non-removable, volatile/non-volatile computer storage media. FIG. 9 illustrates, for example a disk storage 924. Disk storage 924 comprises, but is not limited to, devices like a magnetic disk drive, floppy disk drive, tape drive, Jaz drive, Zip drive, LS-100 drive, flash memory card, or memory stick. In addition, disk storage 924 can comprise storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 924 to the system bus 918, a removable or non-removable interface is typically used such as interface 926.

It is to be appreciated that FIG. 9 describes software that acts as an intermediary between users and the basic computer resources described in suitable operating environment 910. Such software comprises an operating system 928. Operating system 928, which can be stored on disk storage 924, acts to control and allocate resources of the computer 912. System applications 930 take advantage of the management of resources by operating system 928 through program modules 932 and program data 934 stored either in system memory 916 or on disk storage 924. It is to be appreciated that one or more embodiments of the subject disclosure can be implemented with various operating systems or combinations of operating systems.

A user enters commands or information into the computer 912 through input device(s) 936. Input devices 936 comprise, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 comprise, for example, a serial port, a parallel port, a game port, and a universal serial bus (USB). Output device(s) 940 use some of the same type of ports as input device(s) 936. Thus, for example, a USB port can be used to provide input to computer 912, and to output information from computer 912 to an output device 940. Output adapters 942 are provided to illustrate that there are some output devices 940 like monitors, speakers, and printers, among other output devices 940, which require special adapters. The output adapters 942 comprise, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically comprises many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies comprise Fiber Distributed Data Interface (FDDI), Copper Distributed Data Interface (CDDI), Ethernet/IEEE 802.3, Token Ring/IEEE 802.5, and the like. WAN technologies comprise, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the system bus 918. While communication connection 950 is shown for illustrative clarity inside computer 912, it can also be external to computer 912. The hardware/software necessary for connection to the network interface 948 comprises, for exemplary purposes only, internal and external technologies such as, modems including regular telephone grade modems, cable modems and DSL modems, ISDN adapters, and Ethernet cards.

Figure 10:
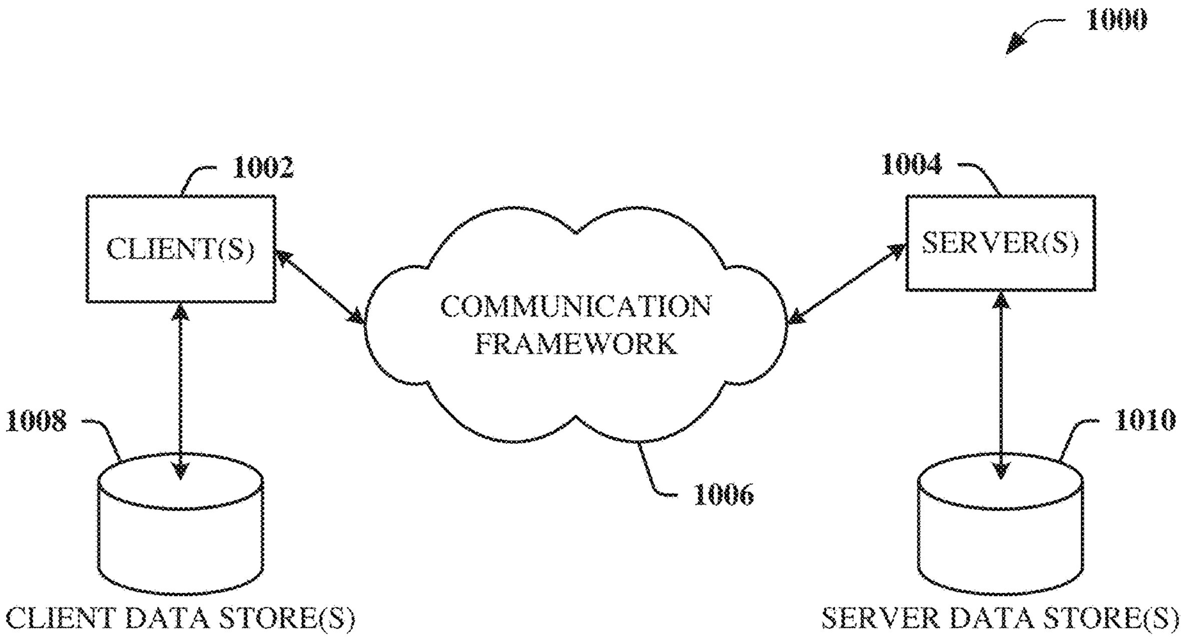
FIG. 10 illustrates an example, non-limiting, networking environment in which one or more embodiments described herein can be facilitated.

FIG. 10 is a schematic block diagram of a sample computing environment 1000 with which the disclosed subject matter can interact. The sample computing environment 1000 includes one or more client(s) 1002. The client(s) 1002 can be hardware and/or software (e.g., threads, processes, computing devices). The sample computing environment 1000 also includes one or more server(s) 1004. The server(s) 1004 can also be hardware and/or software (e.g., threads, processes, computing devices). The servers 1004 can house threads to perform transformations by employing one or more embodiments as described herein, for example. One possible communication between a client 1002 and servers 1004 can be in the form of a data packet adapted to be transmitted between two or more computer processes. The sample computing environment 1000 includes a communication framework 1006 that can be employed to facilitate communications between the client(s) 1002 and the server(s) 1004. The client(s) 1002 are operably connected to one or more client data store(s) 1008 that can be employed to store information local to the client(s) 1002. Similarly, the server(s) 1004 are operably connected to one or more server data store(s) 1010 that can be employed to store information local to the servers 1004.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," "manager," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. Yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable storage media can comprise, but are not limited to, radon access memory (RAM), read only memory (ROM), electrically erasable programmable read only memory (EEPROM), flash memory or other memory technology, solid state drive (SSD) or other solid-state storage technology, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

Disclosed embodiments and/or aspects should neither be presumed to be exclusive of other disclosed embodiments and/or aspects, nor should a device and/or structure be presumed to be exclusive to its depicted element in an example embodiment or embodiments of this disclosure, unless where clear from context to the contrary. The scope of the disclosure is generally intended to encompass modifications of depicted embodiments with additions from other depicted embodiments, where suitable, interoperability among or between depicted embodiments, where suitable, as well as addition of a component(s) from one embodiment(s) within another or subtraction of a component(s) from any depicted embodiment, where suitable, aggregation of elements (or embodiments) into a single device achieving aggregate functionality, where suitable, or distribution of functionality of a single device into multiple device, where suitable. In addition, incorporation, combination or modification of devices or elements (e.g., components) depicted herein or modified as stated above with devices, structures, or subsets thereof not explicitly depicted herein but known in the art or made evident to one with ordinary skill in the art through the context disclosed herein are also considered within the scope of the present disclosure.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

determining, by a system comprising at least one processor, traffic load switching thresholds for respective cells of a group of cells of a communications network;

determining, by the system, respective results of application of a utility function to the respective cells;

based on the traffic load switching thresholds and the respective results of the utility function, determining, by the system, that a selected switching policy for a single cell of the group of cells satisfies a parameter of the utility function; and facilitating, by the system, implementing the selected switching policy for the single cell, wherein respective switching policies of other cells of the group of cells, other than the single cell, are not implemented during the implementing of the selected switching policy for the single cell, wherein the determining of the respective results of the application of the utility function comprises:

determining a first percentage of energy efficiency savings of the group of cells as compared to a peak power consumption, and determining a second percentage of user equipment quality of service achieved compared to a group of satisfied scenarios as a result of the selected switching policy for the single cell and the respective switching policies of the other cells of the group of cells.

2. The method of claim 1, further comprising:

prior to the determining the respective results of application of the utility function, determining, by the system, candidate cells of the group of cells for implementation of the respective switching policies, wherein the candidate cells comprise the single cell and the other cells of the group of cells; and prior to the facilitating the implementing of the selected switching policy for the single cell, selecting, by the system, the single cell based on a result of the respective results associated with the single cell being determined to maximize the utility function as compared to respective other results of the respective results determined for the other cells.

3. The method of claim 1, wherein the selected switching policy for the single cell is a policy that switches off the single cell, and wherein the method comprises:

prior to the facilitating the implementing of the selected switching policy for the single cell, implementing, by the system, a handover of user equipment from the single cell being switched off to a nearby cell selected from the group of cells based on a determination that, prior to the single cell being switched off, a received power level at the user equipment, provided by the nearby cell, satisfies a defined received power level.

4. The method of claim 1, wherein the facilitating of the implementing of the selected switching policy for the single cell comprises:

performing one of:

based on a first determination that a current traffic load of the single cell fails to satisfy a determined traffic load switching threshold for the single cell and the single cell is in an active state, facilitating changing a state of the single cell from the active state to an inactive state;

based on a second determination that the current traffic load of the single cell fails to satisfy the determined traffic load switching threshold for the single cell and the single cell is in the inactive state, facilitating maintaining the single cell in the inactive state;

based on a third determination that the current traffic load of the single cell satisfies the determined traffic load switching threshold for the single cell and the single cell is in the inactive state, facilitating changing the state of the single cell from the inactive state to the active state; and based on a fourth determination that the current traffic load of the single cell satisfies the determined traffic load switching threshold for the single cell and the single cell is in the active state, facilitating maintaining the single cell in the active state.

5. The method of claim 1, wherein the utility function is based on an optimization function that facilitates a tradeoff between user equipment quality of service and cluster wide energy efficiency for the group of cells.

6. The method of claim 5, wherein the user equipment quality of service is defined for respective user equipment classes of user equipment within the communications network.

7. The method of claim 1, wherein the determining of the traffic load switching thresholds is based on a first reinforcement learning model, and wherein the facilitating of the implementing of the selected switching policy for the single cell is based on a second reinforcement learning model.

8. The method of claim 7, further comprising:

after the facilitating of the implementing of the selected switching policy for the single cell, receiving, by the system, first information indicative of state metrics and second information indicative of performance indicators; and determining, by the system, a first reward value to apply to the first reinforcement learning model and a second reward value to apply to the second reinforcement learning model.

9. The method of claim 1, wherein the communications network is deployed as a disaggregated architecture that comprises central units, distributed units, and a near-real-time-radio access network intelligent controller.

10. The method of claim 1, wherein the group of cells is configured to operate according to a new radio network communication protocol.

11. A system, comprising:

at least one processor; and at least one memory that stores executable instructions that, when executed by the at least one processor, facilitate performance of operations, the operations comprising:

based on respective traffic load switching thresholds and respective results of a utility function determined for respective cells of a group of cells of a communication network, selecting a cell from the group of cells, wherein the selecting comprises determining that a result of the utility function for the cell satisfies a parameter of the utility function;

causing a switching policy defined for the cell to be implemented while other switching policies defined for the other cells of the group of cells are not implemented; and determining the respective results of the utility function, comprising:

determining a first percentage of energy efficiency savings of the group of cells as compared to a peak power consumption, and determining a second percentage of user equipment quality of service achieved compared to a group of satisfied scenarios based on the switching policy defined for the cell and the respective switching policies of the other cells of the group of cells.

12. The system of claim 11, wherein the utility function is based on an optimization function that facilitates a tradeoff between user equipment quality of service and cluster wide energy efficiency for the group of cells.

13. The system of claim 12, wherein the user equipment quality of service is defined for respective user equipment classes of user equipment within the communication network.

14. The system of claim 11, wherein the system is implemented by a network intelligence controller that comprises a first agent and a second agent, wherein the first agent determines the respective traffic load switching thresholds, and wherein the second agent determines the respective results of the utility function.

15. The system of claim 14, wherein the first agent determines the respective traffic load switching thresholds based on a first reinforcement learning model trained to a first defined level of confidence, and wherein the second agent determines the respective results of the utility function based on a second reinforcement learning model trained to a second defined level of confidence.

16. A non-transitory machine-readable medium, comprising executable instructions that, when executed by at least one processor of network equipment, facilitate performance of operations, wherein the operations comprise:

determining traffic load switching thresholds and respective results of a utility function for respective cells of a group of cells of a communications network;

based on the respective traffic load switching thresholds and the respective results of the utility function, determining that a selected switching policy for a single cell of the group of cells satisfies a parameter of the utility function; and initiating implementation of the selected switching policy for the single cell, wherein respective switching policies of other cells of the group of cells, other than the single cell, are not implemented during the initiating of the implementing of the selected switching policy for the single cell, wherein the determining of the respective results of the utility function comprises:

determining a first percentage of energy efficiency savings of the group of cells as compared to a peak power consumption, and determining a second percentage of user equipment quality of service achieved compared to a group of satisfied scenarios as a result of the selected switching policy for the single cell and the respective switching policies of the other cells of the group of cells.

17. The non-transitory machine-readable medium of claim 16, wherein the operations further comprise:

prior to the initiating of the implementing of the selected switching policy for the single cell, determining respective results of the utility function for candidate cells of the group of cells for implementation of the respective switching policies, wherein the candidate cells comprise the single cell and the other cells of the group of cells; and selecting the single cell based on a result of the utility function associated with the single cell being determined to maximize the utility function as compared to the respective results of the utility function determined for the other cells.

18. The non-transitory machine-readable medium of claim 16, wherein the utility function is based on an optimization function that facilitates a tradeoff between user equipment quality of service and cluster wide energy efficiency for the group of cells, and wherein the user equipment quality of service is defined for respective user equipment classes of user equipment within the communications network.

19. The non-transitory machine-readable medium of claim 16, wherein the determining of the traffic load switching thresholds is based on a first reinforcement learning model, wherein the facilitating of the implementing of the selected switching policy for the single cell is based on a second reinforcement learning model, and wherein the operations further comprise:

after the facilitating of the implementing of the selected switching policy for the single cell, receiving first information indicative of state metrics and second information indicative of performance indicators; and determining a first reward value to apply to the first reinforcement learning model and a second reward value to apply to the second reinforcement learning model.

20. The non-transitory machine-readable medium of claim 16, wherein the communications network is deployed as a disaggregated architecture that comprises central units, distributed units, and a near-real-time-radio access network intelligent controller.

* * * * *